United States Patent
Sweeting et al.

(10) Patent No.: US 8,595,121 B2
(45) Date of Patent: Nov. 26, 2013

(54) MIDPRICE TRADING WITHIN A SPREAD MARKET

(75) Inventors: Michael Sweeting, Aldershot (GB); Howard W. Lutnick, New York, NY (US); Joseph Noviello, New York, NY (US)

(73) Assignee: BGC Partners, Inc., New York, NY (US)

( * ) Notice: Subject to any disclaimer, the term of this patent is extended or adjusted under 35 U.S.C. 154(b) by 73 days.

(21) Appl. No.: 12/938,189

(22) Filed: Nov. 2, 2010

(65) Prior Publication Data

US 2012/0109809 A1  May 3, 2012

Related U.S. Application Data

(63) Continuation of application No. 10/397,109, filed on Mar. 24, 2003, now Pat. No. 7,827,089.

(51) Int. Cl.
  *G06Q 40/04* (2012.01)
  *G06Q 40/00* (2012.01)
  *G06Q 40/06* (2012.01)
  *G06Q 30/08* (2012.01)

(52) U.S. Cl.
  USPC ............ 705/37; 705/35; 705/36 R; 705/14.49

(58) Field of Classification Search
  CPC ..... G06Q 40/04; G06Q 40/00; G06Q 40/025; G06Q 40/06; G06Q 30/08
  USPC ............... 705/10, 37, 38, 80, 35, 36 R, 14.49
  See application file for complete search history.

(56) References Cited

U.S. PATENT DOCUMENTS

| | | | |
|---|---|---|---|
| 4,980,826 | A | 12/1990 | Wagner |
| 5,845,266 | A | 12/1998 | Lupien et al. |
| 6,098,051 | A | 8/2000 | Lupien et al. |
| 6,912,511 | B1 | 6/2005 | Eliezer et al. |
| 6,996,539 | B1 | 2/2006 | Wallman |

(Continued)

FOREIGN PATENT DOCUMENTS

| | | | | |
|---|---|---|---|---|
| WO | 01/84419 | | 11/2001 | |
| WO | WO 01/84419 | * | 11/2001 | ............. G06F 17/60 |
| WO | 03/036540 | | 5/2003 | |
| WO | WO 03/036540 | * | 5/2003 | ............. G06F 17/60 |

OTHER PUBLICATIONS

Chan et al., Experimental Markets for Product Concepts, Massachusetts Institute of Technology—Artificial Intelligence Laboratory, AI Memo 2001-013, CBCL Memo 200, Jul. 2001, pp. 1-33.*

(Continued)

*Primary Examiner* — Thomas M Hammond, III
*Assistant Examiner* — Barbara Amelunxen
(74) *Attorney, Agent, or Firm* — Thomas D. Bradshaw

(57) ABSTRACT

A system and method is provided to allow traders to submit midprice orders to trade at a price within a spread of a market, preferably at the midpoint of a spread market, while maintaining anonymity of the midprice order. A midprice order is anonymous because other traders do not know whether the submitted midprice orders are orders to buy or orders to sell. A midprice order may remain active until it is traded with a contra midprice order or until a parameter associated with the order is breached, thereby resulting in cancellation of the midprice order.

21 Claims, 12 Drawing Sheets

(56) References Cited

U.S. PATENT DOCUMENTS

| | | | | |
|---|---|---|---|---|
| 7,110,974 | B1* | 9/2006 | Rust | 705/37 |
| 7,299,208 | B1* | 11/2007 | Bailon et al. | 705/37 |
| 7,469,229 | B2 | 12/2008 | Romani | |
| 7,702,572 | B2 | 4/2010 | Jokisch et al. | |
| 2001/0034696 | A1 | 10/2001 | McIntyre | |
| 2001/0037284 | A1 | 11/2001 | Finkelstein et al. | |
| 2001/0044767 | A1 | 11/2001 | Madoff et al. | |
| 2002/0019795 | A1 | 2/2002 | Madoff et al. | |
| 2002/0052827 | A1 | 5/2002 | Waelbroeck et al. | |
| 2002/0091617 | A1 | 7/2002 | Keith | |
| 2002/0099651 | A1* | 7/2002 | May | 705/38 |
| 2002/0111896 | A1 | 8/2002 | Ben-Levy et al. | |
| 2002/0156719 | A1* | 10/2002 | Finebaum et al. | 705/37 |
| 2002/0174060 | A1 | 11/2002 | Friedland et al. | |
| 2002/0194107 | A1* | 12/2002 | Li et al. | 705/37 |
| 2002/0198816 | A1 | 12/2002 | Gilbert et al. | |
| 2003/0004852 | A1* | 1/2003 | Burns | 705/37 |
| 2003/0004853 | A1 | 1/2003 | Ram et al. | |
| 2003/0014354 | A1 | 1/2003 | Madoff et al. | |
| 2003/0033239 | A1* | 2/2003 | Gilbert et al. | 705/37 |
| 2003/0088495 | A1* | 5/2003 | Gilbert et al. | 705/37 |
| 2003/0177126 | A1* | 9/2003 | Weingard et al. | 707/10 |
| 2003/0225673 | A1 | 12/2003 | Hughes et al. | |
| 2004/0236614 | A1 | 11/2004 | Keith | |
| 2004/0236636 | A1* | 11/2004 | Lutnick et al. | 705/26 |
| 2005/0144061 | A1* | 6/2005 | Rarity et al. | 705/10 |
| 2005/0149426 | A1 | 7/2005 | Jokisch et al. | |
| 2005/0192890 | A1* | 9/2005 | Wallman | 705/37 |
| 2006/0229967 | A1 | 10/2006 | Sweeting | |
| 2006/0271469 | A1* | 11/2006 | Rust | 705/37 |
| 2009/0281954 | A1* | 11/2009 | Waelbroeck et al. | 705/80 |
| 2010/0030655 | A1 | 2/2010 | Lutnick et al. | |
| 2010/0185542 | A1 | 7/2010 | Jokisch et al. | |

OTHER PUBLICATIONS

"POSIT 4 in action," printed from www.itginc.com on Jan. 30, 2003 (2 pages).

"POSIT®—How POSIT works," printed from www.itginc.com on Mar. 20, 2003 (2 pages).

"What you may not know about POSIT®," printed from www.itginc.com on Jan. 30, 2003 (2 pages).

"POSIT®, Where Risk control meets cost control," printed from www.iginc.com on Jul. 7, 2004 (2 pages).

"POSIT® After Hours—Bringing Superior Portfolio Controls to After Hours Trading," printed from www.itginc.com on Jul. 7, 2004 (2 pages).

The Primes Auction, http://www.primextrading.com, available through Internet Archive Wayback Machine at http://web.archive.org/web/20021013043720/www.primetrading.com/introduction/two-steps/, as archived on Sep. 28, 2002 and Oct. 13, 2002, respectively.

Pending U.S. Appl. No. 10/966,526 entitled "Systems and Methods for Providing Enhanced Volume-Weighted Average Price Trading", in the name of Phillipp T. Jokisch et al., filed Oct. 15, 2004.

U.S. PTO Office Action for U.S. Appl. No. 10/678,582; 18 pages; Aug. 5, 2008.

"POSIT®," printed from www.equitystation.com on Jan. 30, 2003 (1 page).

"A Powerful New Option for POSIT® Users," printed from www.itginc.com on Jan. 30, 2003 (4 pages).

U.S. PTO Office Action for U.S. Appl. No. 10/397,109; 13 pages; Dec. 28, 2007.

U.S. PTO Office Action for U.S. Appl. No. 10/397,109; 12 pages; Oct. 16, 2008.

European Office Action for European Application No. 04256362.7; 5 pages; Sep. 5, 2008.

Pending U.S. Appl. No. 10/678,582; 41 pages; Oct. 2, 2003.

Pending U.S. Appl. No. 10/397,109; 40 pages, filed Mar. 24, 2003.

U.S. PTO Office Action for U.S. Appl. No. 10/397,109; 12 pages; Feb. 9, 2009.

U.S. PTO Office Action for U.S. Appl. No. 10/966,526; 6 pages; Jan. 6, 2009.

United States Patent and Trademark Office: Office Action for U.S. Appl. No. 10/678,582 in the name of Howard Lutnick, et. al.; 11 pages; Jul. 7, 2006.

United States Patent and Trademark Office: Office Action for U.S. Appl. No. 10/678,582 in the name of Howard Lutnick, et. al.; 23 pages; Aug. 23, 2007.

United States Patent and Trademark Office: Office Action for U.S. Appl. No. 10/678,582 in the name of Howard Lutnick, et. al.; 13 pages; Feb. 20, 2007.

United States Patent and Trademark Office: Office Action for U.S. Appl. No. 10/678,582 in the name of Howard Lutnick, et. al.; 20 pages; Apr. 17, 2008.

United States Patent and Trademark Office; Office Action for U.S. Appl. No. 10/966,526, filed Oct. 15, 2004, in the name of Phillipp T. Jokisch; 14 pages, Apr. 14, 2008.

Notice of Allowance for U.S. Appl. No. 10/966,526; 8 pages; Mar. 17, 2009.

Notice of Allowance for U.S. Appl. No. 10/678,582; 9 pages; Apr. 16, 2009.

"Experimental Markets for Product Concepts" by Nicholas T. Chan, Ely Dahan, Andrew W. Lo, and Thomas Poggio. Jul. 2001. retrieved at <http://hdl.handle.net/1721.1/7233>.

U.S. PTO Office Action for U.S. Appl. No. 12/412,750; 6 pages; Jun. 11, 2009.

Notice of Allowance for U.S. Appl. No. 12/412,750; 6 pages Dec. 2, 2009.

Notice of Allowance for U.S. Appl. No. 12/412,750; 4 pages Mar. 8, 2010.

Gehrig, Thomas; Intermediation in Search Markets; Northwestern University, Center for Mathematical Studies in Economics and Management Science; Discussion Papers: 1058 (1993).

Cully, Paul; IPE Electronic Trade Update; Platts Oilgram News; vol. 78, No. 123, p. 5 (Jun. 27, 2000).

Anonymous; Board of Trade of Kansas City; KCBT President Michael Braude appears on CNBC's "Today's Busines", M2 Presswire (Sep. 25, 1997).

U.S. PTO Office Action for U.S. Appl. No. 12/436,940; Jun. 22, 2010; 16 pages.

U.S. PTO Office Action for U.S. Appl. No. 12/727,717; Oct. 10, 2011; 19 pages.

Australian Examination Report for 2010200795, Jun. 27, 2011, 3 pages.

Australian Examination Report for 2010200795, Sep. 20, 2011, 3 pages.

Australian Examination Report for 2004220731, Sep. 25, 2008, 2 pages.

Notice of Acceptance for 2004220731, Nov. 24, 2009, 3 pages.

Canadian Examination Report for 2,484,813, Jan. 16, 2012, 3 pages.

Notice of Allowance for U.S. Appl. No. 12/436,940; Mar. 23, 2011; 6 pages.

Canadian Examination Report for 2,461,768, Mar. 27, 2012, 5 pages.

U.S. PTO Notice of Allowance for U.S. Appl. No. 12/727,717; 20 pages; Nov. 15, 2012.

U.S. PTO Office Action for U.S. Appl. No. 13/618,118; 15 pages; Nov. 21, 2012.

Canadian Examination Report for 2,484,813, Sep. 5, 2013, 5 pages.

\* cited by examiner

| ITEM | PRICE/YIELD | SIZE | LAST PRICE |
|---|---|---|---|
| BOND A 302 | 5.196 - 5.192 304 | 50 x 20 306 | 5.192 310 |
| BOND B 312 | 99.21 - | 4 x | 99.21 |

| ITEM | MARKET | SIZE | LAST PRICE |
|---|---|---|---|
| BOND A | 5.196 ? 5.192 ⌒356 ⌒304 | 50 x 20 | 5.192 |
| BOND B | 99.21 | 4 x | 99.21 |

Currently Active

| ITEM | SIDE | SIZE | START PRICE | PRICE | SIZE AVAILABLE FOR TRADE |
|---|---|---|---|---|---|
| BOND A | DD MID | 1100 | 5.192 | 5.196 ? 5.192 | 500 |
|  |  |  |  |  | 200 |
|  |  |  |  |  | 400 |

400

| ITEM | PRICE/YIELD | SIZE | LAST PRICE |
|---|---|---|---|
| BOND A | 5.196 - 5.192 | 50 x 20 | 5.192 |
| BOND B | 99.21 - | 4 x | 99.21 |

Price | Size Available For Trade
516
5.196 ? 5.192 | 500 — 540
200 — 542
400 — 544

520

Price | Size Available For Trade
516
5.196 ? 5.192 | 100 — 542
400 — 544

530

Price | Size Available For Trade
5.196 ? 5.190 | 400
502 | 544

FIG. 5

| ITEM | MARKET | | LAST PRICE |
|---|---|---|---|
| BOND A | 100.00+ ? 100.012  106 x 74 | | 100.00 |
| | 99.31+ − 100.01+  50 x 50 | 5  1  100 | |
| | 99.31 − 100.02  100 x 50 | 2  22  50 | |

FIG. 6

700
Price 704
100.00+ ? 100.010

| | 706 | 708 | 710 | 712 | 714 |
|---|---|---|---|---|---|
| | Orientation | Size | P/O | P/S | Start |
| 715 { | Buy | 200 | 100.012 | 0.02 | 100.006 |

720
Price
100.00+ ? 100.01+

| | Orientation | Size | P/O | P/S | Start |
|---|---|---|---|---|---|
| 715 { | Buy | 200 | 100.012 | 0.02 | 100.006 |
| 721 { | Buy | 100 | 100.01+ | 0.02 | 100.010 |

730
Price
100.00+ ? 100.01+

| | Orientation | Size | P/O | P/S | Start |
|---|---|---|---|---|---|
| 721 { | Buy | 100 | 100.01+ | 0.02 | 100.010 |

740
Price
100.01+ 100.02
     744
Orientation    Size    P/O    P/S    Start

FIG. 7

MIDPRICE TRADING WITHIN A SPREAD MARKET

CROSS-REFERENCE TO RELATED APPLICATION

The present application is a continuation of U.S. patent application Ser. No. 10/397,109 filed Mar. 24, 2003 now U.S. Pat. No. 7,827,089, which is hereby incorporated by reference herein in its entirety.

BACKGROUND OF THE INVENTION

This invention relates to systems and methods for trading within a spread market for a particular item. More particularly, systems and methods are provided to trade a particular item at the midprice of the spread market while maintaining anonymity of the order.

Electronic matching and dealing systems have found successful applications in many trading activities, including the buying and selling of a variety of items, such as goods, services, securities, and currency. Electronic trading systems have become popular for the trading of securities, particularly for the trading of fixed-income securities, such as United States Treasuries, United Kingdom Gilts, European Government bonds, and Emerging Market debts, and non-fixed income securities, such as stocks.

In a method of electronic trading, bids and offers are submitted by traders to a trading system. A bid indicates a desire to buy while an offer indicates a desire to sell. These bids and offers are then displayed by the trading system to other traders. The other traders may respond to these bids and offers by submitting sell (or hit) or buy (or lift or take) commands to the trading system. A trade has been executed once a trader has issued a hit or lift (or take) command to the trading system. A trade has been executed once a trader has issued a hit or lift (or take) command in response to a bid or offer, respectively.

In a market, there often exists a spread (a differential in price) between the bid price and the offer price, or between the buy price and sell price. Such markets having disparity among the bid and offer or buy and sell prices are often referred to as spread markets. In conventional spread markets, traders may hit a bid or lift an offer to execute a trade, or traders may submit new bids or offers that improve on existing bid or offer prices. In some occasions, a trader may not be willing to hit a bid or lift an offer for a given spread market, but would be willing to trade at a price located within the spread market. Such an ability to trade within the spread of the market could facilitate trading and thereby create a more liquid market.

However, conventional trading systems do not enable traders to submit buy or sell orders to trade at a price inside or at a midpoint of a spread market, in which the traded price is a price between the minimum allowable increments of the spread market. For example, if the market allows increments of 1, then an item may not be traded at 1.5. Rather, conventional trading systems require that a trader submits a new bid or offer and waits for another trader to hit or lift the new bid or offer in order to execute a trade. In addition, there are trading systems that allow traders to submit orders during a collection period. Then during a matching period, the collected orders are matched up with each other. This type of trading scheme does not provide for continuous trading because of the requisite collection period. Moreover, because orders are collected, a complex matching algorithm is needed to match the orders during the matching period.

In view of the foregoing, it would be desirable to provide an electronic market that enables a trader to buy or sell an item at a price existing within a spread market for a particular item at any given time.

SUMMARY OF THE INVENTION

This and other objects of this invention are accomplished by enabling participants to buy or sell items at a price inside or within the spread market. A price inside a bid or offer price is a price that may induce trading among prospective buyers and sellers because the inside price is closer to market (i.e., price at which bid and offer price are the same). In some cases, traders trade at the midpoint of the spread market. The midpoint, sometimes referred herein as the midprice, is the price existing in the middle of the spread market. Enabling market participants to trade at the midprice of a spread market provides an incentive for market participants to deal (i.e., buy or sell) at prices other than those currently available in the market (e.g., the bid and offer prices of the spread market). For example, if the spread market has bid and offer prices of 4.00 and 5.00, respectively, a trade being executed at the midprice may trade at a price of 4.50.

In another embodiment, a midprice order may be executed at a price within the spread market, but at a calculated price, which may or may not be the midprice. The calculated price is weighted towards either the best bid or offer price available in the market, depending on several factors. The factors can include, for example, the number of buyer or sellers associated with the best bid offer prices and the size of the bids or offers at the best prices.

In order for market participants to trade at the midprice, two or more market participants (at least one buyer and at least one seller) are needed to form a "midprice market" in which items can be exchanged. In order for items to be exchanged at the midprice, a market participant needs to submit "a midprice order" indicating a desire to trade at the midprice. A midprice order is an affirmative order to trade at a price within the spread market, and the midprice order may remain active until it is matched with a contra midprice order or until certain parameters (discussed below) cause its cancellation. Once this order is received, it is checked with other midprice orders to determine whether it can be matched (i.e., a midprice order to buy can be matched with a midprice order to sell) with another midprice order so a trade can be executed.

When a midprice order is received by the trading system, a signifying mark is displayed to indicate to other traders that at least one trader is willing to deal at the midprice. In one embodiment of the invention, traders are not made aware of whether the midprice order is an order to buy or sell or the size of the order. Note that certain embodiments of the present invention may enable traders to know the size of midprice orders, but not whether it is an order to buy or sell. When traders begin submitting orders in response to the signifying mark, orders of like kind (e.g., buy orders) are queued, for example, according to the time in which they were received by the trading system. Thus, if several orders of like kind are received, the orders queued first may be the first orders used to fill contra orders. A midprice order to buy is contra to a midprice order to sell.

Various market forces can cause the market to move, thereby causing the spread market to change prices. When the market moves, the midpoint or calculated trading price may move too. For example, if the market bid price moves from 4.00 to 4.40 and the market offer price moves from 5.00 to 5.40, the midprice changes to 4.90 from 4.50. Because the midprice and market prices can change, they may move beyond a range in which a market participant is willing to trade. Therefore, this invention enables market participants to set parameters (e.g., limits) for which their midprice orders are kept active for midprice trading. In another embodiment, the trading system may set parameters (e.g., limits) for which each midprice order is kept active.

Each midprice order submitted to the trading system is subject to at least two parameters. One such parameter is a price spread parameter. This parameter indicates the range of market prices in which a midprice order is kept active. If the spread of the market (i.e., difference between the bid and offer prices) moves beyond a predefined limit, the order is cancelled. The price spread parameter can be equal to or greater than the spread of the market, but less than the maximum price spread parameter which is set by the trading system.

Another parameter that midprice orders are subject to may be a price out parameter. This parameter can cause an order to be cancelled when the midprice of the market moves to the price set by the price out parameter. For example, if the price out parameter for a particular order is set at 5.50, the midprice order will remain active until the midprice of the market reaches 5.50.

This invention includes at least two prevailing methods in which midprice trading can be implemented. One method is a system control method and another is a user control method. In the system control method, the price spread and price out parameters and any other parameters can be set and controlled by the trading system. In the user control method, the trader can set or define the price spread and price out parameters and any other parameters.

Regardless of which method is used, either method can be implemented with a variety of trading schemes such as, for example, Direct Dealing (hereinafter "DD"), or request for quote style trading and normal market style trading.

In DD style trading, there are requestors and responders. The requestors can enter a request to deal on a particular item or instrument at the midpoint of the spread market, thereby providing an affirmative interest to trade at the midpoint. A requestor may enter a request with a specific midprice buy or sell order, or a requestor may request a midprice order to trade a specified size without indicating an interest to buy or sell. A trader may respond to that request by submitting an order to buy or sell the instrument at the midprice.

Normal market style of trading involves midprice trading in which market participants submit buy or sell midprice orders and those orders that are contra to one another are matched, and those that are similar (e.g., two or more sell orders are similar to each other) are queued for subsequent potential matching.

BRIEF DESCRIPTION OF THE DRAWINGS

The above and other features and advantages of the invention will be apparent upon consideration of the following detailed description, taken in conjunction with accompanying drawings, in which like reference characters refer to like parts throughout, and in which:

FIG. 3 is an illustration of a market cell that may be generated in a DD style of trading which is in accordance with certain embodiments of the present invention;

FIG. 3A is an illustration of a market cell after a market participant submits an order to trade at the midprice in a DD style of trading which is in accordance with certain embodiments of the present invention;

FIG. 4 is an illustration of an alternative market cell shown to all market participants after one or more midprice DD orders have been submitted to the system using a DD style of trading which is in accordance with certain embodiments of the present invention;

FIG. 5 is an illustrative step-by-step example of midprice trading commencing in the market cell of FIG. 4 in accordance with certain embodiments of the present invention;

FIG. 6 is an illustrative market cell shown to market participants trading in a normal market style of trading in accordance with certain embodiments of the present invention;

FIG. 7 shows an illustrative series of snapshots of trading commencing in a normal market style of trading in accordance with certain embodiments of the present invention;

DETAILED DESCRIPTION OF THE INVENTION

Figure 1:
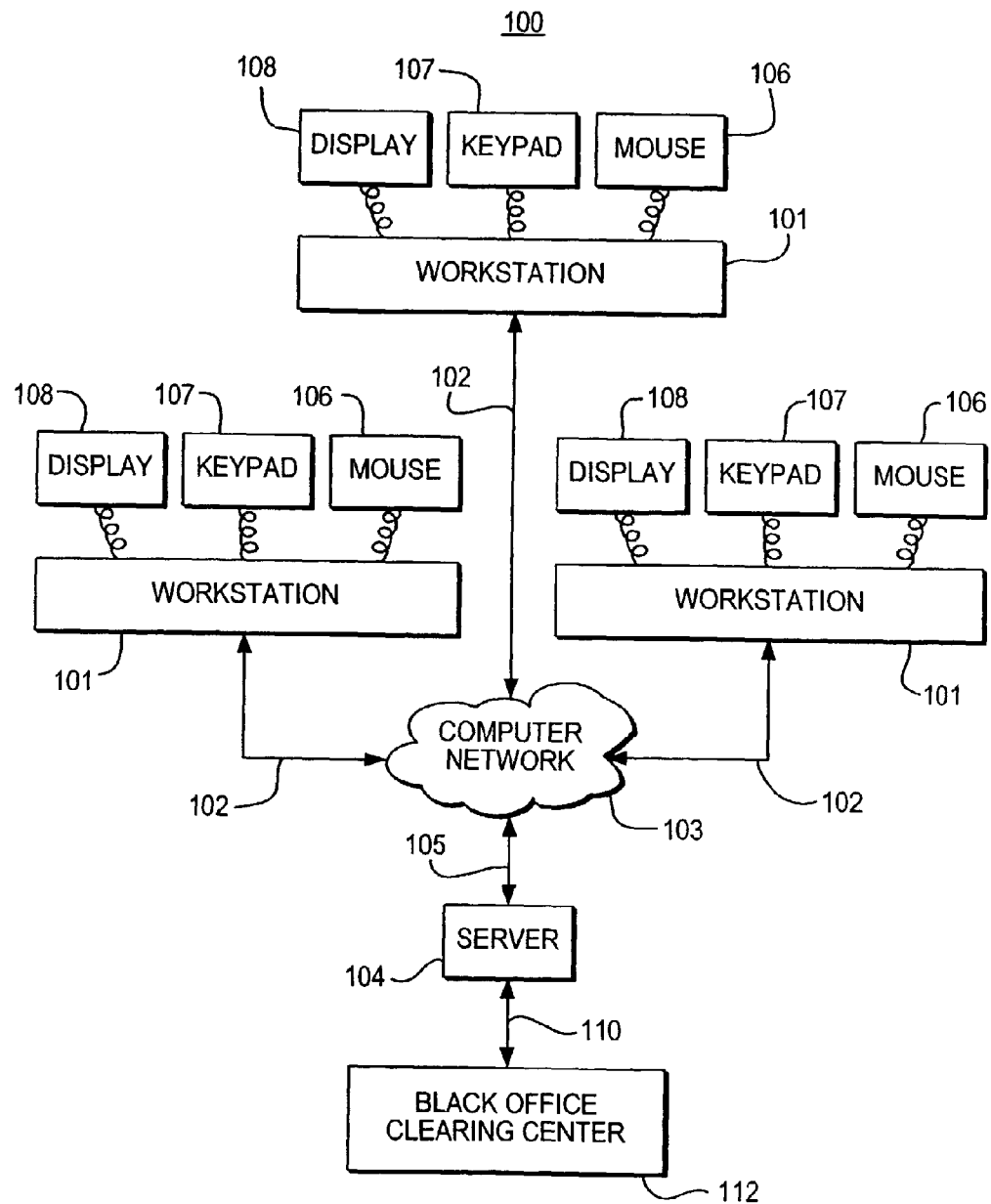
FIG. 1 is a block diagram of a system that may be used to implement the processes and functions in accordance with certain embodiments of the present invention.

Referring to FIG. 1, an exemplary system 100 for implementing the present invention is shown. As illustrated, system 100 may include one or more trading workstations 101 that may include a mouse 106, a keypad 107, and a display 108. Workstations 101 may be local or remote, and are connected by one or more communications links 102 to a computer network 103 that is linked via a communications link 105 to a server 104.

In system 100, server 104 may be any suitable server, processor, computer, or data processing device, or combination of the same. Computer network 103 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 102 and 105 may be any communications links suitable for communicating data between workstations 101 and server 104, such as network links, dial-up links, wireless links, hard-wired links, etc. Each workstation enables a participant to engage in the trading process. Workstations 101 may be personal computers, laptop computers, mainframe computers, dumb terminals, data displays, Internet browsers, Personal Digital Assistants (PDAs), two-way pagers, wireless terminals, portable telephones, etc., or any combination of the same.

A back office clearing center 112 may also be connected to server 104 of the trading system via communications link 110. Clearing center 112 may be any suitable equipment, such as a computer, or combination of the same, for causing trades to be cleared and/or verifying that trades are cleared. If desired, server 104 may contain multiple processors.

Figure 2:
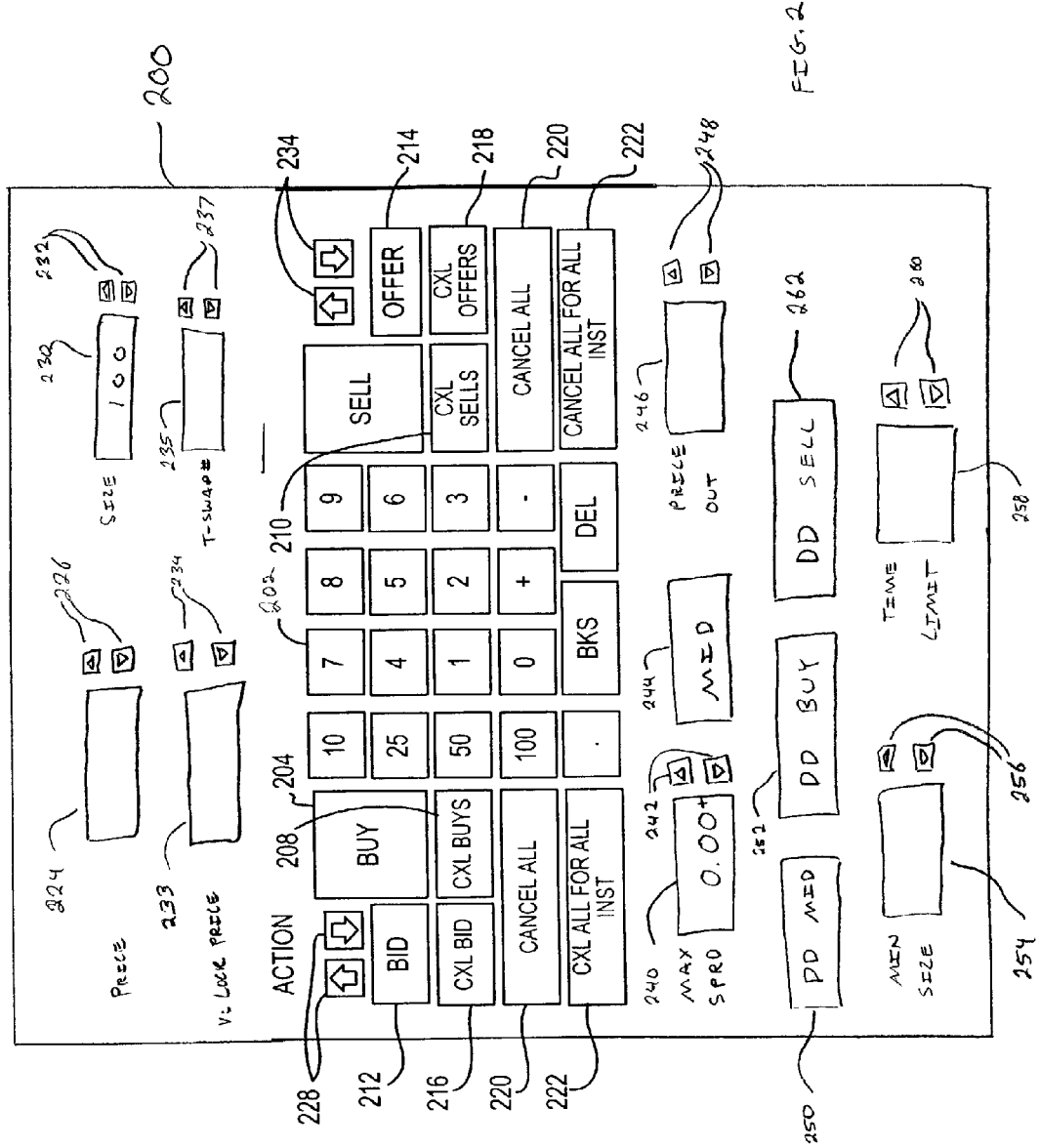
FIG. 2 is an illustration of a dialog window that may be generated in accordance with certain embodiments of the present invention.

FIG. 2 illustrates one embodiment of a graphical interface for submitting trading commands using, for example, a workstation as shown in FIG. 1. As shown, the graphical interface comprises a dialog window 200 with various buttons and entry fields 202-262. Using these buttons and entry fields, a trader may submit a bid command, an offer command, a buy command, or a sell command for an item corresponding to a market cell. A market cell is illustrated below in, for example, FIGS. 3 and 4.

Dialog window 200 may be opened automatically and/or manually before, during, and/or after a trade, and may allow a trader to submit a trade command at any time. The dialog window may be repositioned on a trader's display and/or fixed in place. The trader, preferably, will keep the window associated with a particular instrument below the market cell 100 for the same tradable item. The number of dialog windows 200 that can be kept open at any one time is preferably unlimited.

As shown in FIG. 2, dialog window 200 may comprise a variety of on-screen buttons and entry fields. Generally, a button, as displayed in box 200, may be "pushed" by placing a pointing device's pointer over the button and pressing a switch on the pointing device, as is commonly known in the art. At the center of window 200, a numeric keypad 202 may be displayed. The numeric keypad 202 may provide buttons for numbers zero through nine, and may contain buttons for numbers ten, twenty-five, fifty, and one hundred or any other suitable or desirable values. The numeric keypad 202 may also contain a plus button ("+"), a minus button ("−"), a decimal point button ("."), a backspace button ("BKS"), and a delete button ("DEL").

In addition to displaying a numeric keypad as described above, dialog window 200 may also provide a user with a buy button 204, a sell button 206, a cancel buys button 208, a cancel sells button 210, a bid button 212, an offer button 214, a cancel bids button 216, a cancel offers button 218, cancel all buttons 220, cancel all for all instruments button 222, a price entry field 224, price up and down buttons 226, bid price up and down buttons 228, offer price up and down buttons 234, a size entry field 230, and size up and down buttons 232, Vs Lock Price entry field 233, Lock Price entry field up and down buttons 234, T-Swap# entry field 235, and T-Swap# up and down buttons 237 (T-Swap trading relates to a chosen price movement relationship between two different bonds). Finally, dialog window 200 may contain a preference field (not shown) that allows a user to specify preferred types of orders (e.g., limit order), a close-on-action box (not shown) that causes dialog window 200 to be automatically closed after specified actions are performed.

Dialog window 200 also includes max spread entry field 240, max spread up and down buttons 242, MID button 244, price out entry field 246, price out up and down buttons 248, DD MID button 250, DD BUY 252, minimum size entry field 254, minimum size up and down buttons 256, time limit entry field 258, time limit up and down buttons 260, and DD SELL 262.

Buttons 240-262 enable a market participant to submit a midprice order (e.g., a midprice order in either a normal market style or a DD style of trading). For example, to submit a midprice order in a normal trading style, a trader may select a size in size entry field 230, select MID button 244, and then select either buy button 204 or sell button 206 to choose whether the order is a buy or sell midprice order. If such a midprice order is subject to user controlled parameters, traders can set the price spread parameter at max spread entry field 240 and/or set a price out parameter at price out entry field 246.

The number entered into max spread entry field 240 indicates how far the spread is permitted to move before cancelling the order. For example, if the market at the time of order is "100-101" and the number in max spread entry field is 2.0, the order will be cancelled when the spread exceeds a price differential of 102 (e.g., "99–102").

The number entered into price out entry field 246 indicates the midprice at which an order is cancelled. The price in entry field 246 may indicate the price a trader does not want to deal. If desired, the system may initially set the price out parameter to the last traded price of the item or any other system defined price out parameter. If desired, a trader may be able to adjust the price out parameter to a desired value. If a trader chooses not to enter a number in price out entry field 246, the system may not impose a price out parameter on the order. In this case, the order cannot be cancelled due to the price out parameter, but can be cancelled due to the price spread parameter, or manually (by the user).

When a trader submits orders in a DD trading style, one of buttons DD MID 250, DD BUY 252, or DD SELL 262 may be selected. An initiating trader (e.g., requestor) may select a size at size entry field 230 and select DD MID button 250 to indicate an interest in dealing at the midprice. Traders that respond to the requestor's interest can then choose a size and one of buttons DD BUY 252 and DD SELL 262 to buy or sell at the midprice.

Note that certain features of dialog window 200 may not be available if the trader is trading in a system controlled method of trading. That is, in a system controlled method of trading, traders may not be permitted to manually set the price spread or price out parameters. However, in a user controlled method of training, the trader can set the price out and price spread parameters for either the DD or normal market style of trading.

If desired, traders can set a minimum trading size in minimum size entry field 254 Various markets may require that a minimum size be entered to satisfy any minimize size requirements of a market. Traders may also enter a time limit (in time limit entry field 258) for which a particular order will remain active. Time limits on midprice orders can apply to both manual and request for quote style of trading.

Note that traders may be able to use other devices such as, for example, a keyboard or an interface specifically designed for use with the trading system to place trades and have a similar level of interaction with other trading systems provided by dialog window 200.

FIG. 3 shows an exemplary market cell 300 that can be displayed to traders that are monitoring and/or participating in a market. Market cell 300 shows that the trader is participating in a market in which selected item 302 is being traded. Selected item 302 may be any suitable type of commodity or suitable financial instrument such as, for example, securities, bonds, coupons, stocks, gold, oil, (monetary) deposits, certificate of deposits, etc.

Market cell 300 shows the price 304 and size 306 of item 302 being traded. In this particular embodiment, the prices shown for item 302 are yield prices. Yield prices, as opposed to ordinary prices, indicate the yield available for a given item. For item 302, the current market price 304 is "5.196-5.192." This is known as the bid/offer yield price in which 5.196 (the number to the left of the hyphen) represents the yield bid price, while 5.192 (the number to the right of the hyphen) represents the yield offer price. The bid and offer prices collectively comprise the spread market. The size of item 302 "50×20" may represent the bid and offer size, respectively, of the current market. The size 306 may represent the value in the hundreds (i.e., ×100), thousands (i.e., ×1,000), or millions (i.e., ×1,000,000). Last price 310 indicates the last price at which item 302 was traded. As shown here, item 302 was last traded at "5.192." Market cell 300 also shows price, size, and last price information for other items that were previously traded in the market, such as item 312. This information provides users with market depth and/or market history information.

This invention enables traders to deal an item at the midprice of a spread market. That is, a midprice is the price existing halfway between the spread market at which a particular item is traded in a market. For example, if the market is 5.00 (to buy) and 6.00 (to sell), the midpoint price is 5.50. While the market remains static at these prices, traders that are willing to trade at the midprice will trade at 5.50. Note that the midprice is not necessarily static and that it is subject to change, depending on fluctuations or changes in the market. Midprice trading advantageously provides a trading option that may facilitate liquidity of certain markets and enable traders to trade on items inside regular price increments. Regular price increments may be fixed increments in which traders are able to increase or decrease bid or offer prices.

This invention may also enable traders to deal an item at a price within the spread market that is calculated based on several factors. Rather than using the midpoint of the spread market as the trading price, a calculated trading price advantageously provides flexibility in the price used to trade midprice orders. For example, a calculated midprice may be based on the buyer's weight (i.e., number of bids and their respective sizes) versus the seller's weight (i.e., number of offers and their respective sizes), wherein the bids and offers are associated with the best bid and offer prices available in the market.

FIG. 3A shows an illustrative market cell 350 that is shown to all market participants after a market participant submits a request to deal at the midprice in a DD style of trading. In DD style of trading, two types of traders interact with the trading system. The two types of traders are requestors and responders. A requestor submits a request for midprice quote to designate an intention to buy or sell at the midprice, including the size (i.e., number of items to buy or sell). A responder submits an order indicating a willingness to buy or sell at the midprice. When a responder's order matches a requestor's order, a transaction commences between that responder and the requestor. In addition, if two or more responders have orders that can be matched, trading can commence between the responders.

Market cell 350 is substantially similar to market cell 300 except midprice identifier 356 is displayed to all market participants to indicate that at least one market participant is willing to deal at the midprice (i.e., at least one midprice order is active). Midprice identifier may be a suitable identifier such as, for example, a "?", "*", "MID", etc., and may be displayed in any suitable location in market cell 350, but preferably between the bid and offer price 304. Midprice identifier 356 is intially displayed when a market participant submits a request to trade at the midprice, indicating the size and orientation (e.g., buy or sell) of the order. Thereafter, midprice identifier 356 is displayed when a midprice order is available for trade. The size and orientation of this order, however, is not shown to the other market participants. Moreover, if a market participant responds to the midprice interest, that market participant's order (e.g., size and orientation) is not shown to the other market participants.

Midprice identifier 356 is displayed because midprice orders may be anonymous and therefore may not be displayed in market cell 350. Because midprice orders may be anonymous, traders may not know whether the submitted midprice orders are orders to buy or sell. In addition, traders may not know the size of each midprice order. Note that each midprice order may have an associated price spread parameter and a price out parameter.

The trading system in which market cell 350 operates may determine which midprice DD orders, if any, are matched to each other. In order for midprice DD orders to match, two orders have to be contra or opposite to each other. For example, a buy DD order is contra to a sell DD order. The following example further illustrates midprice trading according to the principles of the present invention.

In this example, assume that the requesting midprice DD order is a buy DD order with a size of 100. After midprice interest 356 is displayed, one or more market participants may submit a midprice DD order (e.g., responding DD orders). If a second midprice DD order is a buy order for 100, that order is queued behind the initial order. Because both the initial and second orders are buy orders, the requesting order is queued first because it was submitted before the second order. If a midprice DD sell order of size 150 is received, the initial buy order is matched with a portion of the sell order and half of the second buy order is used to fill the sell order. As result, a buy DD order of size 50 is currently available for midprice trading.

FIG. 4 shows alternative illustrative market cell 400 that is shown to all market participants after one or more midprice DD orders have been submitted to the system using an DD style of trading. Market cell 400 includes a market cell similar to that shown in FIG. 3A and also includes DD trading window 420, which includes item 422, side 424 (e.g., type of trade), size 426, start price 428, price 430, and trading stack 432. DD trading window 420 may be presented to the market participants when there is a midprice interest, or whenever traders are participating in DD trading.

As illustrated in DD trading window 420, midprice indicator 416 is displayed to alert market participants that a midprice order is available in this market. In addition, trading stack 432 shows sizes of orders that are available for trading at the midprice. In this embodiment, all market participants may be aware of the size available for midprice trading, but do not know whether midprice DD order is an order to buy or sell. A market participant can learn whether the midprice orders are buy or sell orders after submitting a midprice DD order. For example, if a trader submits a buy order that is queued in trading stack 432, that trader (who just submitted the buy order) will know that the sizes in stack 432 are associated with buy orders. If that participant's order was a sell order, that order would be matched to the top listed size in stack 432, thus indicating to the participant that the listed sizes correspond to buy orders.

FIG. 5 illustrates a step-by-step example of midprice trading commencing in market cell 400 in accordance with the principles of the present invention. More particularly, snapshots of price 430 and trading stack 432 of DD trading window 420 of market cell 400 is displayed in FIG. 5 to provide clarity and to prevent overcrowding of the figure. At step 510, stack size 540 is a buy order (of size 500) submitted by the requesting market participant—the market participant that provided the initial DD midprice interest. Stack sizes 542 and 544 are also buy orders (of sizes 200 and 400, respectively) submitted by responders (i.e., market participants that submitted orders in response to the requestor's midprice interest).

Step 520 shows a snapshot of the DD trading window after a market participant submits a DD midprice sell order of size 600. Once this midprice sell order is received, the system matches stack size 540 and 100 units of stack size 542 to the sell order. As a result stack size 542 has size of 100 and stack size 544 remains the same at 400. Note that the requesting market participant is no longer involved in midprice dealing. That said, midprice indicator 516 is still displayed because other participants are prepared to deal at the midprice.

Step 530 shows a snapshot of a portion of the DD trading window after stack size 542 has been cancelled. Note that price 502 has changed from the price in step 520. Because of the change in price, the price spread parameter or the price out parameter, or both may have been breached, which caused the system to cancel the order affiliated with stack size 542. After stack size 542 is removed, only stack size 544 remains for potential midprice trading.

FIG. 6 shows an illustrative market cell 600 of a bid/offer spread market in which a normal market style of trading is provided in accordance with the principle of the present invention. Market cell 600 includes item 602, price 604, size 606 and last price 608. Market cell 600 also includes market depth information 610, which shows price and size for items previously traded. Also shown in market cell 600 are bid and offer stacks 612 and 614, respectively. Bid and offer stacks 612 and 614 may indicate the size a market participant is bidding or offering at the current price 604. Note that price 604 (shown as 100.00+?100.012) is shown in a traditional United States Government Bond pricing format, not the yield pricing format of that shown in FIGS. 3-5.

In a normal market style of trading, market participants may submit bid or offers or hit or lift a bid or offer. Unlike request for quote/DD style of trading, market participants do not submit requests for quotes or respond to those requests. A detailed explanation of a normal market style of trading can be found in U.S. Pat. No. 5,905,974, which is hereby incorporated by reference in its entirety. In accordance with this invention, a market participant can submit orders to deal at the midprice of the market shown in price 604. As shown, midprice indicator 620 is displayed to indicate to other participants that at least one participant is prepared to deal at the midprice.

In normal market trading, all midprice orders are subject to cancellation pursuant to the price spread and price out parameters and other suitable parameters such as time limits. All midprice orders can be anonymous with respect to buy/sell orientation and the orientation of the orders may or may not be made available to the market participants. Thus, when a market participant submits an order, that participant may have no way of knowing if the submitted order will be matched. Furthermore, the identity of traders submitting midprice orders may or may not be anonymous to other traders.

FIG. 7 further illustrates midprice trading in a normal market style of trading by showing a series of snapshots. Because market participants do not see other midprice orders, FIG. 7 illustrates the receipt and matching of orders viewed from a system standpoint. Moreover, FIG. 7 also shows the starting price, the price spread parameter, and the price out parameter for each midprice order. The parameters can be set by the user or by the system. For purposes of this illustration, users have the opportunity to set the parameters.

Furthermore, the instruments being traded in FIG. 7 are U.S. treasury bonds. As known in the art U.S. treasuries are traded at a percentage of a bond's face value. This percentage is typically broken down into 32nds of a point and fractions thereof. The prices shown in FIG. 7 represent the whole number portion and the percentage being traded. For example, consider "100.011." The number left of the decimal point ("100") is equivalent to the whole number portion of the price and the number right of the decimal point ("011") is equivalent to the fractional portion. More particularly, the first two digits right of the decimal point ("01") represent then number of 32nds there are and the third digit represents the number of 8ths of a 32nd there are. In this case, the fraction appended to the whole number portion of the price is $\frac{1}{32}$nd and $\frac{1}{8}$th of a 32nd. Note that some prices may have "+" in the third digit right of the decimal point. The "+" may represent $\frac{4}{8}$ths of a 32nd or half a 32nd, and may be displayed in this instance instead of a "4". Table 1 below shows several examples of the three digit numbers to the right of the decimal point and their fractional equivalents.

TABLE 1

| FRACTIONAL PORTION OF A PRICE | FRACTIONAL EQUIVALENT |
| --- | --- |
| 010 | $\frac{1}{32}$ |
| 011 | $\frac{1}{32}$ & $\frac{1}{8}$ of a 32nd |
| 012 | $\frac{1}{32}$ & $\frac{1}{4}$ of a 32nd |
| 013 | $\frac{1}{32}$ & $\frac{3}{8}$ of a 32nd |
| 014 or 01+ | $\frac{1}{32}$ & $\frac{1}{2}$ of a 32nd |
| 015 | $\frac{1}{32}$ & $\frac{5}{8}$ of a 32nd |
| 016 | $\frac{1}{32}$ & $\frac{3}{4}$ of a 32nd |
| 017 | $\frac{1}{32}$ & $\frac{7}{8}$ of a 32nd |

Note that the above description of concerning U.S. treasuries is merely an example of an instrument that may be traded using the present invention.

Midprice snapshot 700 shows the current price of the market at price 704, orientation 706, size 708, price out parameter 710, price spread parameter 712, and start price 714. Midprice order 715 is a buy order with size "200." The market participant that submitted this order selected a price out of "100.012" and price spread of "0.02." If the midprice of the market reaches or exceeds price out 710 of "100.012," the system can cancel midprice order 715. If the spread of the market exceeds price spread 712 "0.02," the system can cancel midprice order 715. Start price 714 (shown as "100.006") is displayed to indicate the midprice of the market when the order was submitted.

Midprice snapshot 720 shows new midprice order 721 with a buy orientation, a size of 100, price out of "100.01+," price spread of "0.02," and a start price of "100.010." Start price 714 of midprice order 721 is different than the start price of midprice order 715 because the market price changed to "100.00+-100.01+." Before referring to snapshot 730, assume that a midprice sell order of size 200 was submitted.

Midprice snapshot 730 shows that midprice order 715 has been removed from the system because it was matched with the above-mentioned sell order. Hence, midprice order 715 was traded at the midpoint of the spread, which is "100.010." Because midprice order 715 has been matched with a contra order, midprice order 721 is now the lone order remaining in the queue. If, for example, another sell order is submitted to the system, midprice order 721 may be used first to fill that sell order.

Midprice snapshot 740 shows that midprice order 721 has been removed from the queue. As shown in price 744, the spread is "100.01+-100.02." In fact, midprice order 721 may have been cancelled because the midpoint of the spread market is "100.016." A midpoint of "100.016" exceeds the price out parameter for midprice order 721, which is "100.01+", thereby resulting in cancellation of midprice order 721.

Note that the snapshots shown in FIG. 7 are merely illustrative and that additional snapshots may be added or that certain snapshots may be deleted.

Figure 8:
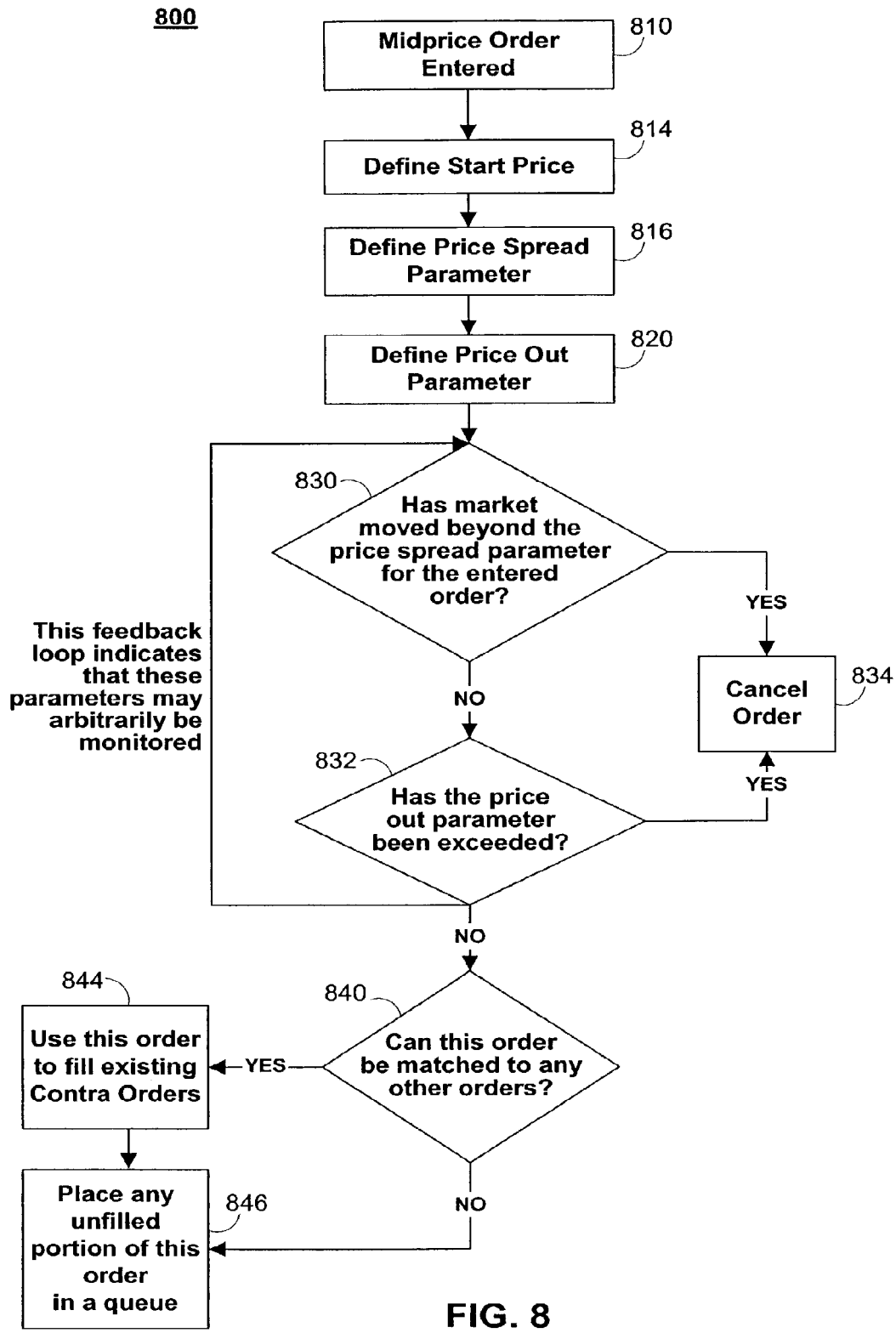
FIG. 8 shows a flowchart illustrating a system control method of midprice trading being implemented in a normal market style of trading in accordance with certain embodiments of the present invention.

FIG. 8 shows a flowchart 800 illustrating a system control method being implemented in a normal market style of trading in accordance with the principles of the present invention. At step 810, a midprice order is submitted. Once a midprice order is submitted, the system defines a start price. The start price sets a basis for determining when the order can be canceled. The start price can be set by using the midprice at the time the order is submitted, as shown in step 814. If the market is actively trading, that is, there is a spread differential of zero, the trading price may be used as the start price.

At step 816, the system defines the price spread threshold parameter. The price spread parameter sets a limit for how wide the spread market can get before an order is cancelled. For example, if the spread market parameter for a particular order is "0.02," that order can be canceled when the spread of the market exceeds "0.02." Thus, any order initially submitted to the system may have a price spread parameter that is at least equal to the market spread. Otherwise, if the price spread parameter is less than the current market spread, the order may be cancelled immediately upon receipt by the system.

At step 820, the system defines a price out parameter. The price out parameter defines how far the market midprice is able to move from the start price before canceling the order. For example, the system may define a price out parameter of 3/32nd of a point. If this parameter is associated with a buy order, the order may be cancelled when the midpoint of the spread rises 3/32nd of a point above the start price. If this parameter is associated with a sell order, the order may be cancelled when the midpoint of the spread falls 3/32nd of a point below the start price.

Note that if the midprice order is a limit midprice order, the order may not be cancelled when a parameter is breached. Rather, trading of this particular order may merely be suspended during the duration of a parameter breach. If the market moves back to a position which is within the limits set by the parameters, the order may be reactivated.

Now that flowchart 800 has assigned the requisite parameters for determining whether an order should be cancelled, flowchart 800 continues to step 830. At step 830, the system determines if the market spread has expanded beyond the price spread threshold. If the price spread threshold is exceeded, the order is canceled at step 834, otherwise if the price spread threshold is not breached, the order is maintained and process 800 proceeds to step 832. At step 832, the system determines whether the price out parameter has been exceeded. If the price out parameter has been exceeded, the order is canceled at step 834. If the price out parameter is not exceeded, the order is maintained and the process proceeds to step 840.

Note that the parameters tested for in steps 830 and 832 may be continuously checked to determine whether an order can be canceled. As illustrated in flowchart 800, a feedback loop is provided to show that these parameters may be arbitrarily checked.

At step 840, the system determines if this order can be matched with any other orders. Orders that can be matched are orders that are contra or opposite to each other. For example, a buy order and a sell order are contra to each other. If this order cannot be matched, it is queued according to time priority at step 846. Orders are queued according to time so the system can determine which order should be used first when matching contra orders.

If at step 840, it is determined that an order can be filled, the process proceeds to step 844. At step 844, the system matches opposite orders to the fullest extent possible. Orders are matched to the fullest extent possible because various buy and sell orders may have different sizes. For example, assume that several "small" size sell orders are queued in the system before a "large" size buy order is accepted.

Once the buy order is received, the system begins to match this buy order with the queued sell orders. Assuming that the sell orders are able to fill seventy percent of the buy order, the buy order is filled to the fullest extent. The remaining portion (thirty percent) of the buy order remains active, ready to fill any additional midprice sell orders. Any portion of the order that is not used to fill an existing order is placed in a queue, as shown in step 846.

The trading system may impose a temporary delay in filling orders when the midpoint of the spread market changes. For example, the system may impose a delay for some predetermined period of time (e.g., one second) to avoid execution of trades at unexpected prices. More particularly, if a user is about to enter an order to deal at the midpoint, the system may force the trader to wait for a predetermined period of time prior to accepting that order.

Moreover, if a market participant submits an order to hit a bid or lift (or take) an offer when midprice orders are currently active in the market, the system may fill the hit or lift order with a contra midprice order. For example, if a midprice order to sell is available in the market and a trader takes an offer, the system may use the midprice order to fill the trader's hit.

Note that steps shown in FIG. 8 are merely illustrative and that additional steps may be added and some of the steps may be omitted or modified.

Figure 9:
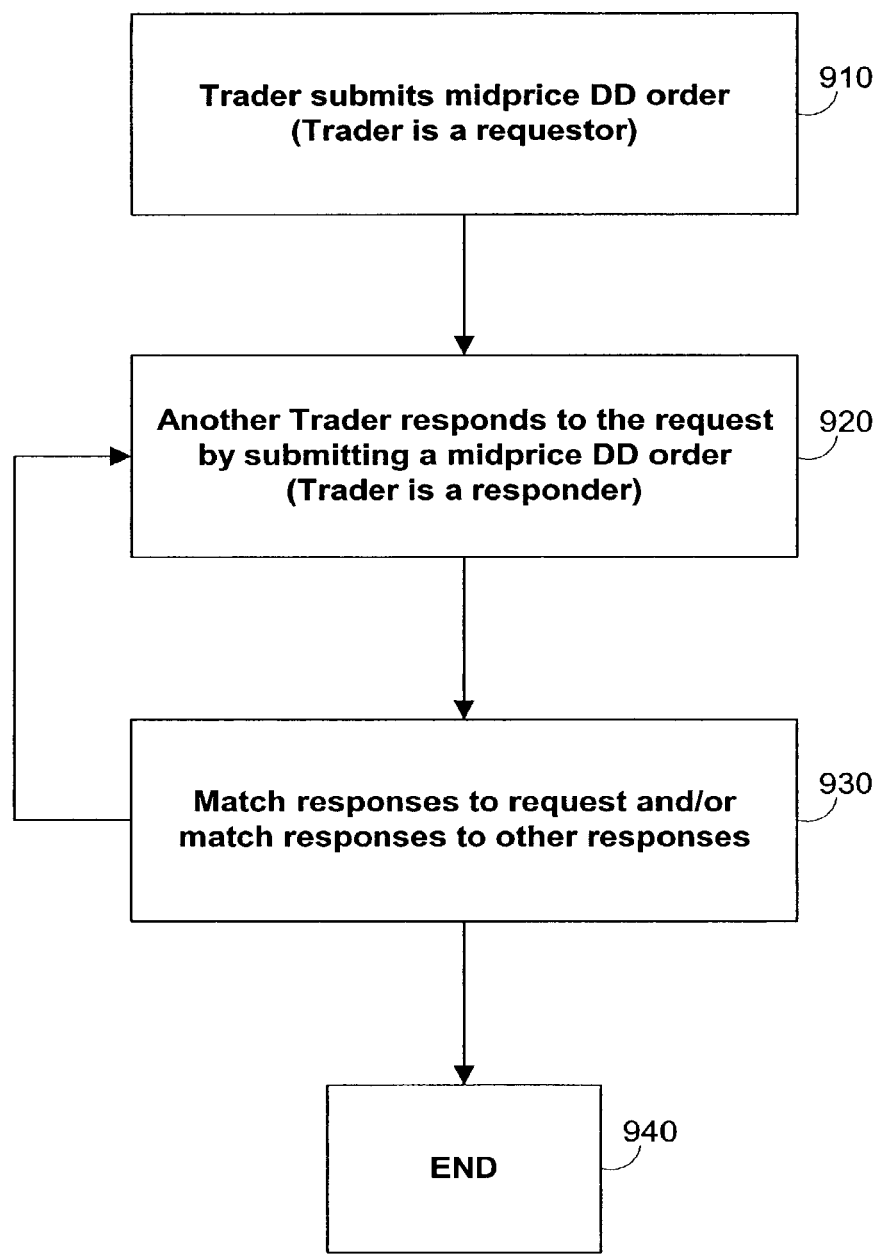
FIG. 9 shows a flowchart illustrating a system control method of midprice trading being implemented in a DD style of trading in accordance with certain embodiments of the present invention.

FIG. 9 shows an illustrative process 900 that enables traders to place midprice DD orders in accordance with the principles of the present invention. A thorough explanation of DD trading can found in United States patent application publication No. 20020198816-A1 and U.S. patent application Ser. No. 10/113,841 filed Mar. 29, 2002, both disclosures of which are hereby incorporated by reference in their entireties.

At step 910, a trader can submit a midprice DD order, thereby making a bid/offer at the midprice. Once a midprice DD order is entered, the system may display the start price (i.e., the midprice of the spread at the time the midprice DD was entered). The system may indicate to other traders that a midprice DD has been submitted by displaying a predefined identifying mark or symbol such as, for example, an asterisk or an exclamation point.

At step 920, traders can submit responses to the midprice request. In this step, traders respond by submitting a buy or sell command with a particular size. Note that any number of traders may respond, and the time in which the traders respond determines when that response will be matched, if it is matched at all.

Once traders begin responding, the system matches the responses at step 930. That is, if a response is contra to the requestor's intention, a trade is executed between the requestor and the responder. For example, if the requestor intended to offer a thousand units of an item at the midprice and the responder submitted an order bidding a thousand units at the midprice selected by the requestor, the orders are matched.

The system can also match orders between responders, and not solely between the requestor and responders. Responders that submit responses that are tradable with each other can be matched. For example, if one responder submits an offer of 5.00 and another responder submits a bid of 5.00, trade should commence between these two responders. FIG. 9 shows a feedback loop originating from step 930 and returning to step

920. This feedback loop is shown to indicate that midprice trading persists until each midprice DD order is cancelled or matched.

Once all trading is complete or all orders are cancelled, the process ends at step 940.

As discussed above in conjunction with FIG. 8, the price spread threshold and the price out parameters also apply to DD trading. A requestor's midprice interest will be subject to system defined parameters that determine when to cancel the requestor's midprice interest. For example, if the bid/offer spread expands to such an extent that it breaches the price spread threshold parameter for that particular midprice interest, the system may cancel that interest. Similarly, if the midpoint of the spread market migrates to a price that exceeds the price out parameter set for a particular interest, the system can cancel that order. Responders' submissions are also subject to the price spread threshold and price out parameters.

Note that the steps shown in FIG. 9 are merely illustrative and that additional steps may be added and some steps may be deleted or modified.

The above discussion concerning FIGS. 8 and 9 relates to embodiments of this invention that involve the system control method (i.e., the system sets the price spread threshold and price out parameters). The discussion pertaining to FIGS. 10 and 11 relate to embodiments of this invention involving user control methods (i.e., a trader is able to set the price spread threshold and price out parameters).

Figure 10:
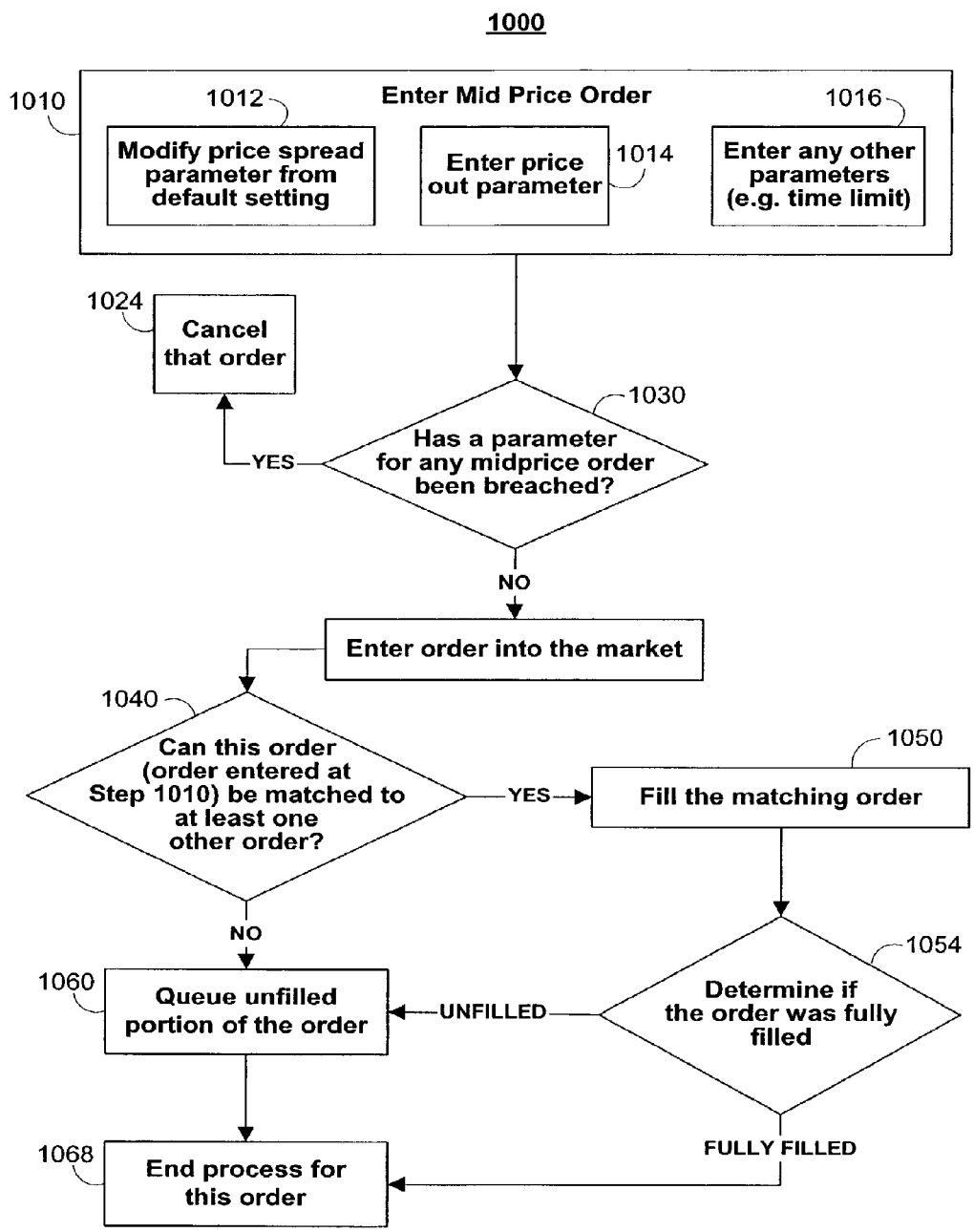
FIG. 10 shows a flowchart illustrating a user control method of midprice trading being implemented in a normal market style of trading in accordance with certain embodiments of the present invention.

FIG. 10 shows an illustrative process 1000 of a user control method being implemented in a "normal" style of trading according to the principles of the present invention. At step 1010, a trader can enter a midprice order, where the trader inputs a size and selects whether the order is a bid, offer, buy, or sell order. In addition to selecting the type and size of the midprice order, traders can modify the default price spread threshold setting at step 1012, and can enter a price out parameter at step 1014. If desired, the trader can increase or decrease the price spread threshold parameter using, for example, price spread up and down buttons 242 of dialog window 200 (of FIG. 2). In general, the larger the price spread threshold parameter, the longer the trader's order may remain active in the market. The same logic applies to the price out parameter; the farther away the price out parameter is from the current midprice, the longer the order may remain active.

At step 1030, the system determines if one of the parameters have been breached for a particular order. Preferably, the system checks each midprice order that is active to determine which of those orders, if any, have a parameter that has been breached. In particular, the system determines whether the price spread threshold parameter has been exceeded and whether the price out parameter has been exceeded. If desired, step 1030 can also check for any additional parameters that are attached to a particular order. For example, some orders may have a time limit that limits the time duration in which the order remains active. If a particular order's time limit is expired, the system may cancel that order at step 1024.

If the system determines that a parameter is breached for a particular order, that order is canceled at step 1024. On the other hand, if the system determines that none of the parameters have been breached, the process continues to step 1040. At step 1040, the system determines if the recently entered order can be matched to one or more orders. If the order can be matched, it is filled with existing orders according to time priority (e.g., order in which the order was received) in step 1050. At step 1054, if the system determines that the order cannot be fully filled any unfilled portion of the order is queued in step 1060. Thus, the unfilled portion of the order is queued according to time priority and may be used to fill subsequent orders. If the process at step 1054 determines that the order has been fully filled, then the process concerning this particular order is complete, which is indicated by step 1068.

Referring back to step 1040, if it is determined that the order cannot be matched with at least one other order, it is queued in step 1060. After the order is queued, the process proceeds to step 1068, which ends the process for this particular order.

Note that the steps shown in FIG. 10 are merely illustrative and that additional steps may be added and some of the steps may be omitted or modified.

Figure 11:
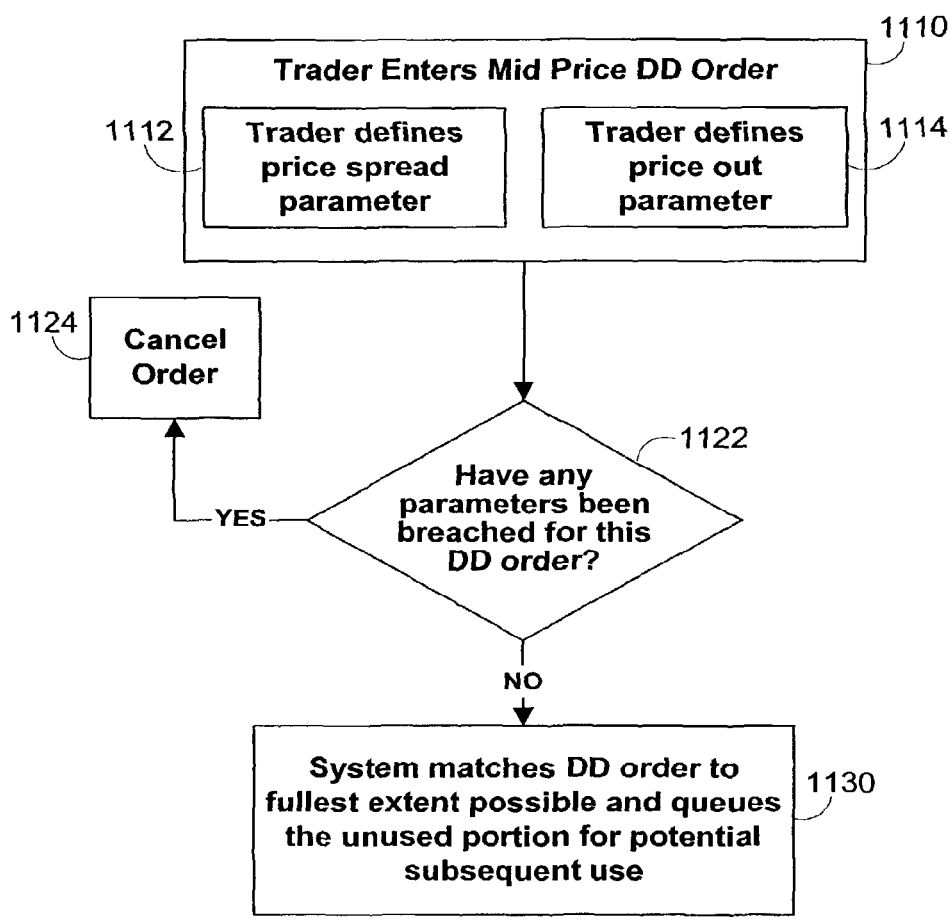
FIG. 11 shows a flowchart illustrating a user control method of midprice trading being implemented in a DD style of trading in accordance with certain embodiments of the present invention.

FIG. 11 shows an illustrative process 1100 of a user control method being implemented in a "DD" style of trading according to the principles of the present invention. This process operates in a substantially similar way as process 900 of FIG. 9, except that a trader is provided with the ability to choose the parameters (e.g., price spread threshold parameter and price out parameter).

At step 1110, a trader enters a midprice DD order and can define a price spread parameter (at step 1112) and define a price out parameter (at step 1114) for that order. The process proceeds to step 1122, where the system checks if any parameters have been breached. If a parameter is breached, the order is cancelled at step 1124, otherwise process 1100 proceeds to step 1130. At step 1130, the system matches the DD order to the fullest extent possible and queues any unused portion of the order for potential subsequent use.

Note that the steps shown in FIG. 11 are merely illustrative and that additional steps may be added and some steps may be deleted or modified.

Thus, systems and methods for providing midprice trading are provided. One skilled in the art will realize that the present invention can be practiced by other than the described embodiments, which are presented for purposes of illustration and not of limitation, and that the present invention is limited only by the claims which follow.

We claim:

1. A method for trading an item within a spread market for the item, the method being implemented on an electronic trading system, the method comprising:

communicating, by at least one processor, a plurality of orders for the item to a plurality of market participants, each order comprising a buy/sell orientation defining whether such order is a bid to purchase the item or an offer to sell the item, such that the buy/sell orientation of the plurality of orders is disclosed to the plurality of market participants in such a way that the plurality of market participants are made aware of whether each of the plurality of orders is an order to buy the item or an order to sell the item, in which the plurality of orders comprises a best bid having a best bid price and a best offer having a best offer price that is greater than the best bid price;

receiving, by at least one processor, from a first user of the electronic trading system a first midprice order to buy or sell the item conditioned on an execution price of the first midprice order being greater than the best bid price and less than the best offer price, in which the first midprice order to buy or sell the item comprises a buy/sell orientation defining whether the first midprice order is a bid to purchase the item or an offer to sell the item;

communicating, by the at least one processor, the first midprice order to a plurality of market participants such that the buy/sell orientation of the midprice order is not disclosed to the plurality of market participants, such that the plurality of market participants are not made aware whether the order is an order to buy the item or an order to sell the item;

receiving, by the at least one processor, from a second user of the electronic trading system a second midprice order to buy or sell the item conditioned on an execution price of the second midprice order being within a spread market for the item, in which the second midprice order to buy or sell the item comprises a buy/sell orientation that is contra to the buy/sell orientation of the first midprice order;

matching, by the at least one processor, at least a portion of the first midprice order with at least a portion of the second midprice order;

calculating, by the at least one processor, an execution midprice based at least in part on a current best bid price for the item and a current best offer price for the item; and executing a trade for at least a portion of the first midprice order against the second midprice order at the calculated execution midprice.

2. The method of claim 1, in which the act of calculating the execution midprice comprises calculating a weighted average price based at least on a current best bid price and a current best offer price for the item, and at least one of a buy side weight and a sell side weight, in which the calculated weighted average price is not equal to the average of the best bid price and the best offer price, and wherein the buy side weight is based on a number of buy side orders and the sell side weight is based on a number of sell side orders.

3. The method of claim 2, wherein the buy side weight comprises a number of and respective sizes of buy side orders at the best bid price and the sell side weight comprises a number of and respective sizes of sell side orders at the best offer price.

4. The method of claim 1, further comprising:
receiving from a user a third midprice order for the item conditioned on a price of the item when the third midprice order is executed being within the spread market and at least one parameter that defines a range of market prices; and
cancelling the third midprice order based on a determination that the spread market has moved beyond the range of market prices.

5. The method of claim 4, further comprising:
after cancelling the third midprice order, determining that the spread market has moved within the range of market prices; and
reactivating the third midprice order based on the act of determining that the spread market has moved within the range of market prices.

6. The method of claim 1, further comprising:
receiving from a user a third midprice order for the item conditioned on a price of the item when the third midprice order is executed being within the spread market and at least one parameter that defines a threshold price; and
cancelling the third midprice order based on a determination that a weighted average price for the spread market exceeds the defined threshold price.

7. The method of claim 1, wherein when the first midprice order is received, the first midprice order is substantially immediately executed.

8. The method of claim 1, in which the second midprice order is entered into the electronic trading system by the second user at a trading interface by selecting a midprice button that is separate from any buttons used to select non-midprice orders.

9. The method of claim 1, in which the act of executing a trade for at least a portion of the first midprice order against the second midprice order at the calculated execution midprice comprises executing a trade for a portion of the first midprice order against a total quantity of the second midprice order at the calculated execution midprice, further comprising:
queuing an untraded portion of the first midprice order for use in subsequent trading.

10. The method of claim 1, in which the act of communicating the first midprice order to the plurality of market participants comprises causing a signifying mark to be displayed to the plurality of market participants, the signifying mark indicating to the plurality of market participants that at least one midprice order for the item is active in the electronic trading system.

11. A system for trading an item within a spread market for the item comprising:
at least one processor; and
memory that stores instructions which, when executed, direct the at least one processor to perform the following method:
communicate a plurality of orders for the item to a plurality of market participants, each order comprising a buy/sell orientation defining whether such order is a bid to purchase the item or an offer to sell the item, such that the buy/sell orientation of the plurality of orders is disclosed to the plurality of market participants in such a way that the plurality of market participants are made aware of whether each of the plurality of orders is an order to buy the item or an order to sell the item, in which the plurality of orders comprises a best bid having a best bid price and a best offer having a best offer price that is greater than the best bid price;
receive from a first user of the electronic trading system a first midprice order to buy or sell the item conditioned on an execution price of the first midprice order being greater than the best bid price and less than the best offer price, in which the first midprice order to buy or sell the item comprises a buy/sell orientation defining whether the first midprice order is a bid to purchase the item or an offer to sell the item;
communicate the first midprice order to a plurality of market participants such that the buy/sell orientation of the midprice order is not disclosed to the plurality of market participants, such that the plurality of market participants are not made aware whether the order is an order to buy the item or an order to sell the item;
receive from a second user of the electronic trading system a second midprice order to buy or sell the item conditioned on an execution price of the second midprice order being within a spread market for the item, in which the second midprice order to buy or sell the item comprises a buy/sell orientation that is contra to the buy/sell orientation of the first midprice order;
match at least a portion of the first midprice order with at least a portion of the second midprice order;
calculate an execution midprice based at least in part on a current best bid price for the item and a current best offer price for the item; and
execute a trade for at least a portion of the first midprice order against the second midprice order at the calculated execution midprice.

12. The system of claim 11, in which the act of calculating the execution midprice comprises calculating a weighted average price based at least on a current best bid price and a current best offer price for the item, and at least one of a buy side weight and a sell side weight, in which the calculated weighted average price is not equal to the average of the best bid price and the best offer price, and wherein the buy side weight is based on a number of buy side orders and the sell side weight is based on a number of sell side orders.

13. The system of claim 12, wherein the buy side weight comprises a number of and respective sizes of buy side orders at the best bid price and the sell side weight comprises a number of and respective sizes of sell side orders at the best offer price.

14. The system of claim 11, further comprising:
receiving from a user a third midprice order for the item conditioned on a price of the item when the third midprice order is executed being within the spread market and at least one parameter that defines a range of market prices; and
cancelling the third midprice order based on a determination that the spread market has moved beyond the range of market prices.

15. The system of claim 14, further comprising:
after cancelling the third midprice order, determining that the spread market has moved within the range of market prices; and
reactivating the third midprice order based on the act of determining that the spread market has moved within the range of market prices.

16. The system of claim 11, further comprising:
receiving from a user a third midprice order for the item conditioned on a price of the item when the third midprice order is executed being within the spread market and at least one parameter that defines a threshold price; and
cancelling the third midprice order based on a determination that a weighted average price for the spread market exceeds the defined threshold price.

17. The system of claim 11, wherein when the first midprice order is received, the first midprice order is substantially immediately executed.

18. The system of claim 11, in which the second midprice order is entered into the electronic trading system by the second user at a trading interface by selecting a midprice button that is separate from any buttons used to select non-midprice orders.

19. The system of claim 11, in which the act of executing a trade for at least a portion of the first midprice order against the second midprice order at the calculated execution midprice comprises executing a trade for a portion of the first midprice order against a total quantity of the second midprice order at the calculated execution midprice, further comprising:
queuing an untraded portion of the first midprice order for use in subsequent trading.

20. The system of claim 11, in which the act of communicating the first midprice order to the plurality of market participants comprises causing a signifying mark to be displayed to the plurality of market participants, the signifying mark indicating to the plurality of market participants that at least one midprice order for the item is active in the electronic trading system.

21. A non-transitory machine-readable medium having instructions stored thereon which, when executed by at least one processor, direct the at least one processor to:
communicate a plurality of orders for the item to a plurality of market participants, each order comprising a buy/sell orientation defining whether such order is a bid to purchase the item or an offer to sell the item, such that the buy/sell orientation of the plurality of orders is disclosed to the plurality of market participants in such a way that the plurality of market participants are made aware of whether each of the plurality of orders is an order to buy the item or an order to sell the item, in which the plurality of orders comprises a best bid having a best bid price and a best offer having a best offer price that is greater than the best bid price;
receive from a first user of the electronic trading system a first midprice order to buy or sell the item conditioned on an execution price of the first midprice order being greater than the best bid price and less than the best offer price, in which the first midprice order to buy or sell the item comprises a buy/sell orientation defining whether the first midprice order is a bid to purchase the item or an offer to sell the item;
communicate the first midprice order to a plurality of market participants such that the buy/sell orientation of the midprice order is not disclosed to the plurality of market participants, such that the plurality of market participants are not made aware whether the order is an order to buy the item or an order to sell the item;
receive from a second user of the electronic trading system a second midprice order to buy or sell the item conditioned on an execution price of the second midprice order being within a spread market for the item, in which the second midprice order to buy or sell the item comprises a buy/sell orientation that is contra to the buy/sell orientation of the first midprice order;
match at least a portion of the first midprice order with at least a portion of the second midprice order;
calculate an execution midprice based at least in part on a current best bid price for the item and a current best offer price for the item; and
execute a trade for at least a portion of the first midprice order against the second midprice order at the calculated execution midprice.

* * * * *